United States Patent
Takahashi et al.

(10) Patent No.: US 11,060,751 B2
(45) Date of Patent: Jul. 13, 2021

(54) AIR-CONDITIONING CONTROL SYSTEM AND AIR-CONDITIONING CONTROL METHOD

(71) Applicant: PANASONIC INTELLECTUAL PROPERTY MANAGEMENT CO., LTD., Osaka (JP)

(72) Inventors: Hayato Takahashi, Hyogo (JP); Kayo Kondo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/486,756

(22) PCT Filed: Jan. 23, 2018

(86) PCT No.: PCT/JP2018/001990
§ 371 (c)(1),
(2) Date: Aug. 16, 2019

(87) PCT Pub. No.: WO2018/179732
PCT Pub. Date: Oct. 14, 2018

(65) Prior Publication Data
US 2019/0360715 A1 Nov. 28, 2019

(30) Foreign Application Priority Data
Mar. 30, 2017 (JP) .............................. JP2017-068555

(51) Int. Cl.
*F24F 11/62* (2018.01)
*F24F 11/80* (2018.01)
(Continued)

(52) U.S. Cl.
CPC .............. *F24F 11/62* (2018.01); *F24F 7/007* (2013.01); *F24F 11/75* (2018.01); *F24F 11/76* (2018.01); *F24F 11/80* (2018.01); *F24F 2110/10* (2018.01)

(58) Field of Classification Search
None
See application file for complete search history.

(56) References Cited

U.S. PATENT DOCUMENTS

| 3,804,156 A * | 4/1974 | McDonough | F24F 1/00 |
| | | | 165/205 |
| 2005/0051321 A1* | 3/2005 | Lee | F24F 1/0007 |
| | | | 165/234 |

(Continued)

FOREIGN PATENT DOCUMENTS

| EP | 3511639 A1 * | 7/2019 | ............ F24F 11/61 |
| JP | 2005090824 A * | 4/2005 | |

(Continued)

OTHER PUBLICATIONS

International Search Report and Written Opinion, dated Apr. 3, 2018 in International Application No. PCT/JP2018/001990; with partial English translation.

*Primary Examiner* — Jennifer L Norton
(74) *Attorney, Agent, or Firm* — McDermott Will and Emery LLP (57) ABSTRACT

An air-conditioning control system configured to control air conditioning in a building that includes an air-conditioning room in which an air conditioner is provided and a first air-inflow room into which air flows from the air-conditioning room. The air-conditioning control system includes: a temperature obtaining unit configured to obtain a temperature of the first air-inflow room; and a controller configured (Continued)

to control the air conditioner, based on the temperature obtained by the temperature obtaining unit.

8 Claims, 7 Drawing Sheets

(51) Int. Cl.
  *F24F 11/75* (2018.01)
  *F24F 11/76* (2018.01)
  *F24F 7/007* (2006.01)
  *F24F 110/10* (2018.01)

(56) References Cited

U.S. PATENT DOCUMENTS

| | | | | |
|---|---|---|---|---|
| 2012/0037714 | A1* | 2/2012 | Tsutsumi | F24F 11/74 |
| | | | | 236/49.3 |
| 2015/0027151 | A1* | 1/2015 | Cur | F25B 41/22 |
| | | | | 62/117 |
| 2017/0051937 | A1* | 2/2017 | Toyoshima | F24F 11/62 |
| 2017/0350610 | A1* | 12/2017 | Michielsen | B01D 46/0043 |
| 2020/0292198 | A1* | 9/2020 | Funada | F24F 11/74 |
| 2021/0100135 | A1* | 4/2021 | Gao | H05K 7/1497 |

FOREIGN PATENT DOCUMENTS

| | | | |
|---|---|---|---|
| JP | 2009-216367 A | 9/2009 | |
| JP | 2013-133945 A | 7/2013 | |
| JP | 2013-221725 A | 10/2013 | |
| JP | 2015-045489 A | 3/2015 | |
| JP | 2015-169395 A | 9/2015 | |
| WO | WO-2018047343 A1 * | 3/2018 | ............. F24F 11/77 |

* cited by examiner

AIR-CONDITIONING CONTROL SYSTEM AND AIR-CONDITIONING CONTROL METHOD

CROSS-REFERENCE OF RELATED APPLICATIONS

This application is the U.S. National Phase under 35 U.S.C. § 371 of International Patent Application No. PCT/JP2018/001990, filed on Jan. 23, 2018, which in turn claims the benefit of Japanese Application No. 2017-068555, filed on Mar. 30, 2017, the entire disclosures of which Applications are incorporated by reference herein.

TECHNICAL FIELD

The present invention relates to an air-conditioning control system which controls air conditioning in a building and the like, and to an air-conditioning control method used for the air-conditioning control system.

BACKGROUND ART

For example, as described in Patent Literature (PTL) 1, a technique which controls air conditioning in a building and the like is conventionally known.

CITATION LIST

Patent Literature

PTL 1: Japanese Unexamined Patent Application Publication No. 2015-45489

SUMMARY OF THE INVENTION

Technical Problem

Typically, in a building and the like where people are active, there may be rooms (for example, a half bath and a washroom) in which no air conditioners that are typified by air-conditioning devices are provided.

And, although there are rooms in which no air conditioners are provided, there is a desire for adjusting temperatures of those rooms according to the temperatures of the rooms.

Accordingly, an object of the present invention is to provide an air-conditioning control system capable of adjusting the temperature of a room according to the temperature of the room even if no air conditioner is provided in the room. In addition, an object of the present invention is to provide an air-conditioning control method used for the air-conditioning control system.

Solutions to Problem

In order to achieve the above-described objects, an air-conditioning control system according to an aspect of the present invention is an air-conditioning control system configured to control air conditioning in a building that includes an air-conditioning room in which an air conditioner is provided and a first air-inflow room into which air flows from the air-conditioning room, the air-conditioning control system includes: a temperature obtaining unit configured to obtain a temperature of the first air-inflow room; and a controller configured to control the air conditioner, based on the temperature obtained by the temperature obtaining unit.

In addition, an air-conditioning control method according to an aspect of the present invention is an air-conditioning control method performed by an air-conditioning control system configured to control air conditioning in a building that includes an air-conditioning room in which an air conditioner is provided and a first air-inflow room into which air flows from the air-conditioning room, the air-conditioning control method includes: obtaining a temperature of the first air-inflow room; and controlling the air conditioner, based on the temperature.

Advantageous Effect of Invention

According to the present invention, although there is no air conditioner provided in a room, the temperature of the room can be adjusted according to the temperature of the room.

DESCRIPTION OF EXEMPLARY EMBODIMENTS

Hereinafter, exemplary embodiments will be described with reference to drawings. The exemplary embodiments described here describe specific examples of the present invention. The numerical values, shapes, structural elements, the arrangement and the connection of the structural elements, and steps (processes) and the processing order of the steps, and the like described in the following exemplary embodiments are mere examples, and thus are not intended to limit the present invention. Components according to the following exemplary embodiments not mentioned in any of the independent claims are described as optional additional components. It should be noted that the drawings are schematic diagrams, and do not necessarily provide strictly accurate illustration.

Embodiment

Hereinafter, an air-conditioning control system according to an embodiment will be described.

The air-conditioning control system according to the embodiment is used in, for example, buildings, such as homes, offices, stores, and hospitals.

Here, as an example, air-conditioning control system 1 which is used in home 10 will be described with reference to the drawings.

[1. Configuration of Air-Conditioning Control System 1]

Figure 1:
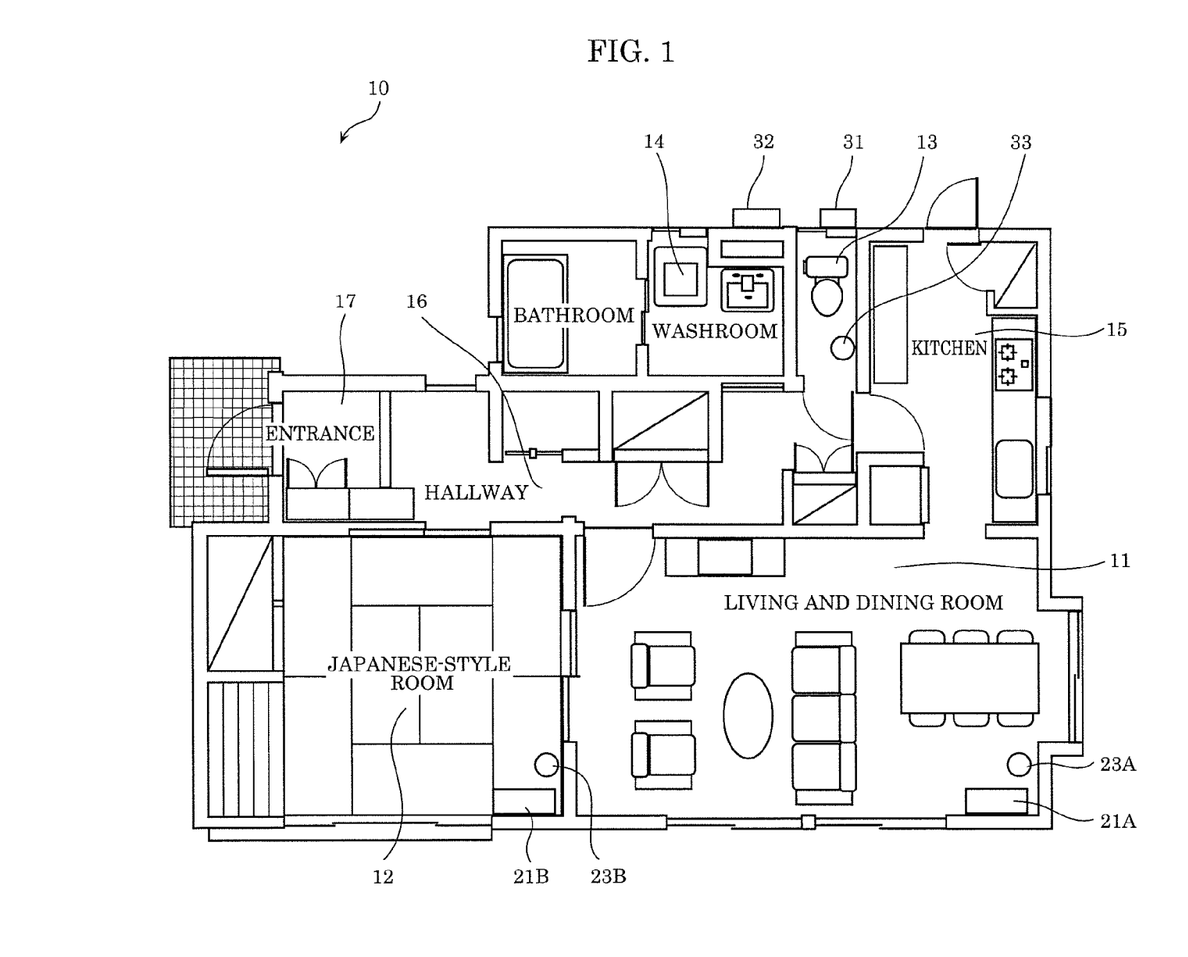
FIG. 1 is a sketch of a home according to an embodiment.

FIG. 1 is a sketch of home 10 which uses air-conditioning control system 1.

As illustrated in the diagram, home 10 is consisted of living and dining room 11, Japanese-style room 12, half bath 13, washroom 14, kitchen 15, hallway 16, and entrance 17.

In living and dining room 11, air conditioner 21A and sensor 23A are provided. And in Japanese-style room 12, air conditioner 21B and sensor 23B are provided.

Air conditioner 21A and air conditioner 21B have the same function. For this reason, air conditioner 21A and air conditioner 21B will also be generically called air conditioner 21, except for the case where air conditioner 21A and air conditioner 21B need to be described individually. In addition, since air conditioner 21 is provided in living and dining room 11 and Japanese-style room 12, living and dining room 11 and Japanese-style room 12 will also be generically called an air-conditioning room, except for the case where living and dining room 11 and Japanese-style room 12 need to be described individually.

Air conditioner 21 is, for example, an air-conditioning device which air-conditions an air-conditioning room in which air conditioner 21 itself is provided.

Air conditioner 21 delivers cool air or warm air to maintain the temperature of the air-conditioning room in which air conditioner 21 itself is provided at a set temperature that is preset by a user.

As the set temperature that is set for the air-conditioning room, air conditioner 21 is settable to a standard set temperature, and a power-saving set temperature in which power consumption of the air conditioner is less than power consumption of the air conditioner in the standard set temperature.

For example, in the winter season (the period during which air heating is needed), the standard set temperature may be 20° C., and the power-saving set temperature may be 18° C. In addition, for example, in the summer season (the period during which air cooling is needed), the standard set temperature may be 25° C., and the power-saving set temperature may be 27° C.

Air conditioner 21 has a function of communicating with an external device, and a set temperature that is set for an air-conditioning room is settable according to a control signal from the external device with which air conditioner 21 communicates.

Sensor 23A and sensor 23B have the same function. For this reason, sensor 23A and sensor 23B will also be generically called sensor 23, except for a case where sensor 23A and sensor 23B need to be described individually.

Sensor 23 detects whether a person is present in an air-conditioning room in which sensor 23 itself is provided. In addition, sensor 23 has a function of communicating with an external device. Sensor 23 is realized by, for example, an infrared human sensor which includes a communication interface.

In half bath 13, first air-discharge fan 31 and temperature sensor 33 are provided.

First air-discharge fan 31 discharges air in half bath 13 to the outside to cause the air from an air-conditioning room to flow into half bath 13 via hallway 16. In the following, half bath 13 will also be called a first air-inflow room. The first air-inflow room and the air-conditioning rooms are partitioned from one another with walls and doors. Meanwhile, there are ventilation portions (for example, ventilation holes and the like) in which air flows in and out in the walls and the doors. This allows the inflow of air from an air-conditioning room to the first air-inflow room. In addition, first air-discharge fan 31 has a function of communicating with an external device, and a volume of air to be discharged is settable according to a control signal from the external device with which first air-discharge fan 31 communicates. For example, first air-discharge fan 31 is realized by a ventilation fan which includes a communication interface.

Temperature sensor 33 detects the temperature of the first air-inflow room. In addition, temperature sensor 33 has a function of communicating with an external device. Temperature sensor 33 is realized by, for example, a thermometer which includes a communication interface.

In washroom 14, second air-discharge fan 32 is provided.

Second air-discharge fan 32 discharges air in washroom 14 to the outside to cause air from an air-conditioning room to flow into washroom 14 via hallway 16. In the following, washroom 14 will also be called a second air-inflow room. The second air-inflow room and the air-conditioning rooms are partitioned from one another with walls and doors. Meanwhile, there are ventilation portions (for example, ventilation holes and the like) in which air flows in and out in the walls and the doors. This allows the inflow of air from an air-conditioning room to the second air-inflow room. In addition, the second air-discharge fan has a function of communicating with an external device, and a volume of air to be discharged is settable according to a control signal from the external device with which second air-discharge fan 32 communicates. For example, second air-discharge fan 32 is realized by a ventilation fan which includes a communication interface.

Here, it is assumed that air conditioner 21, sensor 23, first air-discharge fan 31, second air-discharge fan 32, and temperature sensor 33 are maintained in 24-hour operation during the season when air conditioning, such as air cooling or air heating, is necessary.

Figure 2:
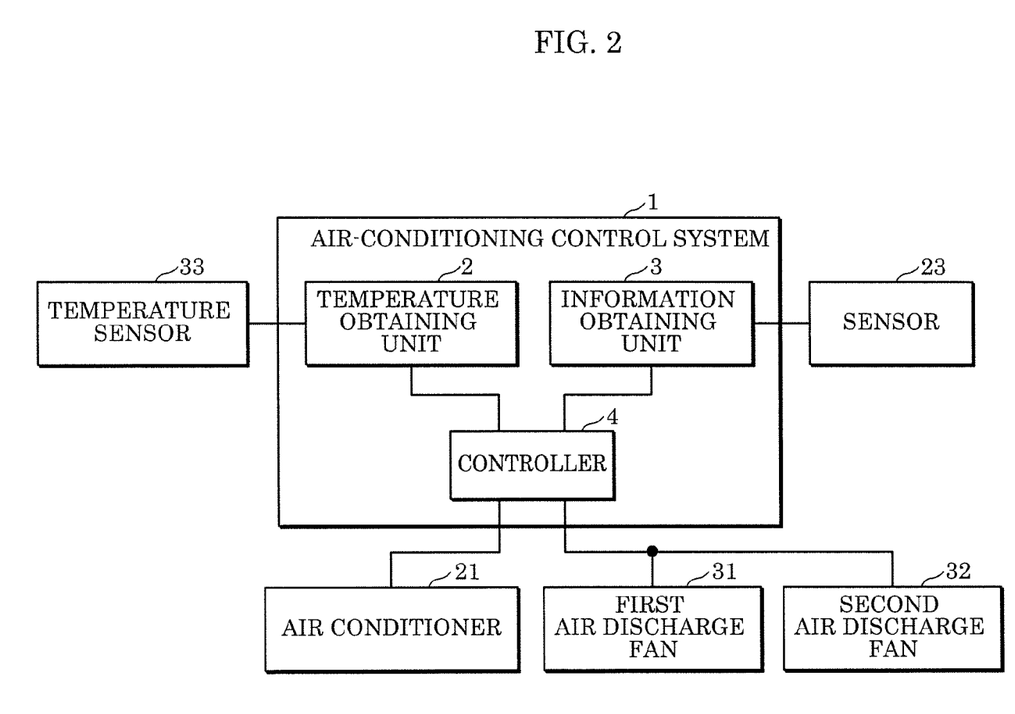
FIG. 2 is a block diagram illustrating a configuration of an air-conditioning control system according to the embodiment.

FIG. 2 is a block diagram illustrating the configuration of air-conditioning control system 1 used in home 10 which consists as described above.

As illustrated in the diagram, air-conditioning control system 1 includes temperature obtaining unit 2, information obtaining unit 3, and controller 4.

Air-conditioning control system 1 is realized by, for example, a computer device which includes a processor, a memory, and a communication interface.

Temperature obtaining unit 2 obtains the temperature of the first air-inflow room. More specifically, temperature obtaining unit 2 communicates with temperature sensor 33 to obtain, from temperature sensor 33, the temperature of the first air-inflow room which is detected by temperature sensor 33.

For example, temperature obtaining unit 2 is realized by a processor which is not illustrated executing a program stored in a memory which is not illustrated.

Information obtaining unit 3 obtains information indicating whether a person is present in an air-conditioning room. More specifically, information obtaining unit 3 communicates with sensor 23 to obtain, from sensor 23, information indicating whether a person is present in the air-conditioning room which is detected by sensor 23.

For example, information obtaining unit 3 is realized by a processor which is not illustrated executing a program stored in a memory which is not illustrated.

Controller 4 controls air conditioner 21 based on a temperature obtained by temperature obtaining unit 2.

When air conditioner 21 is set to the power-saving set temperature, and the difference between the standard set temperature and the temperature obtained is greater than the difference between the power-saving set temperature and the temperature obtained, controller 4 may perform following operation, for example. That is, when the difference between the standard set temperature and the temperature obtained exceeds a first temperature difference that is greater than the difference between the standard set temperature and the power-saving set temperature, controller 4 controls air conditioner 21 such that the set temperature set in air conditioner 21 is changed from the power-saving set temperature to the standard set temperature. For example, the first temperature difference may be 4° C. when the difference between the standard set temperature and the power-saving set temperature is 2° C. That is, the first temperature difference in the winter season (the period during which air heating is needed) may be 4° C. when the standard set temperature is 20° C. and the power-saving set temperature is 18° C. In addition, the first temperature difference in the summer season (the period during which air cooling is needed) may be 4° C. when the standard set temperature is 25° C. and the power-saving set temperature is 27° C.

In addition, when air conditioner 21 is set to the standard set temperature, and the difference between the standard set temperature and the temperature obtained is greater than the difference between the power-saving set temperature and the temperature obtained, controller 4 may perform following operation, for example. That is, when the difference between the standard set temperature and the temperature obtained drops below a second temperature difference that is smaller than the first temperature difference, controller 4 controls air conditioner 21 such that the set temperature set in air conditioner 21 is set, from the standard set temperature, to the power-saving set temperature. For example, the second temperature difference may be 3° C. when the difference between the standard set temperature and the power-saving set temperature is 2° C., and the first temperature difference is 4° C. That is, the second temperature difference in the winter season (the period during which air heating is needed) may be 3° C. when the standard set temperature is 20° C., the power-saving set temperature is 18° C., and the first temperature difference is 4° C. In addition, the second temperature difference in the summer season (the period during which air cooling is needed) may be 3° C. when the standard set temperature is 25° C., the power-saving set temperature is 27° C., and the first temperature difference is 4° C.

In addition, for example, only when information obtained by information obtainer 3 is negative, controller 4 may control the air conditioner to set the set temperature that is set for an air-conditioning room to be the power-saving set temperature.

In addition, for example, controller 4 may control, based on the temperature obtained by temperature obtaining unit 2, a first air-discharge volume that is a volume of air discharged by first air-discharge fan 31 per unit time. At this time, controller 4 may control the first air-discharge volume and a second air-discharge volume that is a volume of air discharged by second air-discharge fan 32 per unit time to cause the sum of the first air-discharge volume and the second air-discharge volume to remain invariable.

For example, controller 4 is realized by a processor which is not illustrated executing a program stored in a memory which is not illustrated.

Hereinafter, operation performed by air-conditioning control system 1 which is configured as described above will be described with reference to the drawings.

[2. Operation of Air-Conditioning Control System 1]
[2-1. Air-Conditioning Control Processing]

Air-conditioning control system 1 performs, as its distinctive operation, air-conditioning control processing.

This air-conditioning control processing is processing for obtaining the temperature of the first air-inflow room and controlling an air conditioner and the like based on a temperature obtained.

Figure 3:
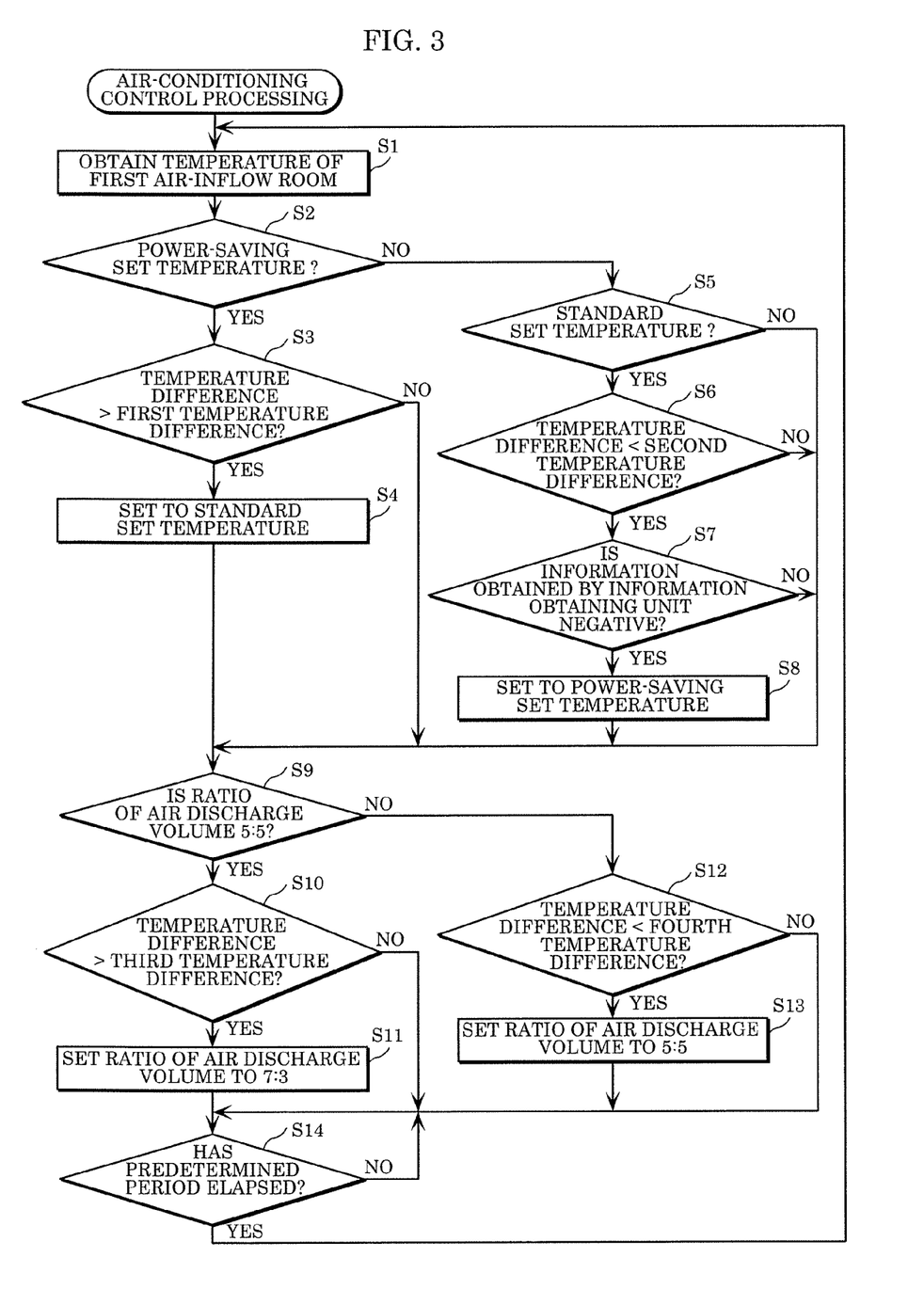
FIG. 3 is a flowchart illustrating air-conditioning control processing according to the embodiment.

FIG. 3 is a flowchart illustrating air-conditioning control processing.

This air-conditioning control processing starts by the activation of air-conditioning control system 1.

When the air-conditioning control processing starts, temperature obtaining unit 2 communicates with temperature sensor 33 to obtain, from temperature sensor 33, the temperature (hereinafter, also referred to as the "temperature obtained") of the first air-inflow room which is detected by temperature sensor 33 (step S1).

After the temperature of the first air-inflow room is obtained, controller 4 communicates with air conditioner 21 to determine whether the set temperature set in air conditioner 21 is set to the power-saving set temperature (step S2).

In the process of step S2, when the set temperature is set to the power-saving set temperature (YES in step S2), controller 4 determines whether the difference between the temperature obtained in the process of step S1 and the standard set temperature is greater than a first temperature difference (step S3).

In the process of step S3, when the difference between the temperature obtained and the standard set temperature exceeds the first temperature difference (YES in step S3), controller 4 controls air conditioner 21 to change the set temperature to the standard set temperature. Then, air conditioner 21 sets the set temperature to the standard set temperature (step S4).

In the process of step S2, when the set temperature is not set to the power-saving set temperature (NO in step S2), controller 4 communicates with air conditioner 21 to determine whether the set temperature set in air conditioner 21 is set to the standard set temperature (step S5).

In the process of step S5, when the set temperature is set to the standard set temperature (YES in step S5), controller 4 determines whether the difference between the temperature obtained in the process of step S1 and the standard set temperature is smaller than a second temperature difference (step S6).

In the process of step S6, when the difference between the temperature obtained and the standard set temperature is smaller than the second temperature difference (YES in step S6), information obtaining unit 3 communicates with sensor 23 to obtain information indicating whether a person is present in an air-conditioning room. Then, controller 4 determines whether information obtained by information obtaining unit 3 is negative (step S7).

In the process of step S7, when the information obtained is determined as negative (YES in step S7), controller 4 controls air conditioner 21 to change the set temperature to the power-saving set temperature. Then, air conditioner 21 sets the set temperature to the power-saving set temperature (step S8).

Proceed to the process of step S9: after the process of step S4 completes; after the process of step S8 completes; when, in the process of step S3, the difference between the temperature obtained and the standard set temperature does not exceed the first temperature difference (NO in step S3); when, in the process of step S5, the set temperature is not set to the standard set temperature (NO in step S5); when, in the process of step S6, the difference between the temperature obtained and the standard set temperature does not fall below the second temperature difference (NO in step S6); and when, in the process of step S7, the obtained information is negative (NO in step S7). In the process of step S9, controller 4 communicates with first air-discharge fan 31 and second air discharge 32 to determine whether the ratio of the first air-discharge volume to the second air-discharge volume is 5:5 (step S9).

In the process of step S9, when the ratio is 5:5 (YES in step S9), controller 4 determines whether the difference between the temperature obtained in the process of step S1 and the standard set temperature is greater than a third temperature difference (step S10).

In the process of step S10, when the difference between the temperature obtained and the standard set temperature is greater than the third temperature difference (YES in step S10), controller 4 controls first air-discharge fan 31 and second air-discharge fan 32 to change the ratio of the first air-discharge volume to the second air-discharge volume to 7:3. Then, first air-discharge fan 31 and second air-discharge fan 32 set the volume of the first air-discharge volume and the volume of the second air-discharge volume, respectively, so that the ratio of the first air-discharge volume to the second air-discharge volume will be 7:3 (step S11).

In the process of step S9, when the ratio is not 5:5 (NO in step S9), controller 4 determines whether the difference between the temperature obtained in the process of step S1 is smaller than a fourth temperature difference (step S12).

In the process of step S12, when the difference between the temperature obtained and the standard set temperature is smaller than the fourth temperature difference (YES in step S12), controller 4 controls first air-discharge fan 31 and second air-discharge fan 32 to change the ratio of the first air-discharge volume to the second air-discharge volume to 5:5. Then, first air-discharge fan 31 and second air-discharge fan 32 set the volume of the first air-discharge volume and the volume of the second air-discharge volume, respectively, so that the ratio of the first air-discharge volume to the second air-discharge volume will be 5:5 (step S13).

Proceed to the process of step S14: after the process of step S11 completes; after the process of step S13 completes; when, in the process of step S10, the difference between the temperature obtained and the standard set temperature does not exceed the third temperature difference (NO in step S10); and when, in the process of step S12, the difference between the temperature obtained and the standard set temperature does not fall below the fourth temperature difference (NO in step S12).

In the process of step S14, air-conditioning control system 1 will be on standby until a predetermined time (for example, one minute) elapses from the last time temperature obtaining unit 2 has obtained the temperature obtained (repeat NO in step S14). Then, after the predetermined period has elapsed (YES in step S14), air-conditioning control system 1 proceeds to the process of step S1 again, and repeat the processes after step S1.

[2-2. Example of Specific Operation]

The following describes, with reference to the drawings, specific examples of a change in the temperature of the first air-inflow room when air-conditioning control system 1 performs the above-described air-conditioning control processing.

A first specific example and a second specific example are specific examples in which a person is not present in an air-conditioning room and, the standard set temperature is 20° C., the power-saving set temperature is 18° C., the first temperature difference is 5° C., the second temperature difference is 4° C., the third temperature difference is 6° C., and the fourth temperature difference is 3° C. in the winter season (the period during which air heating is needed). In these specific examples, the set temperature initially set in air conditioner 21 is preset to the power-saving set temperature, and the ratio of the first air-discharge volume to the second air-discharge volume is initially set to 5:5.

A third specific example and a fourth specific example are specific examples in which a person is not present in an air-conditioning room and, the standard set temperature is 20° C., the power-saving set temperature is 18° C., the first temperature difference is 6° C., the second temperature difference is 3° C., the third temperature difference is 5° C., and the fourth temperature difference is 4° C. in the winter season (the period during which air heating is needed). In these specific examples, the set temperature initially set in air conditioner 21 is preset to the power-saving set temperature, and the ratio of the first air-discharge volume to the second air-discharge volume is initially set to 5:5.

[2-2-1. First Specific Example]

Figure 4:
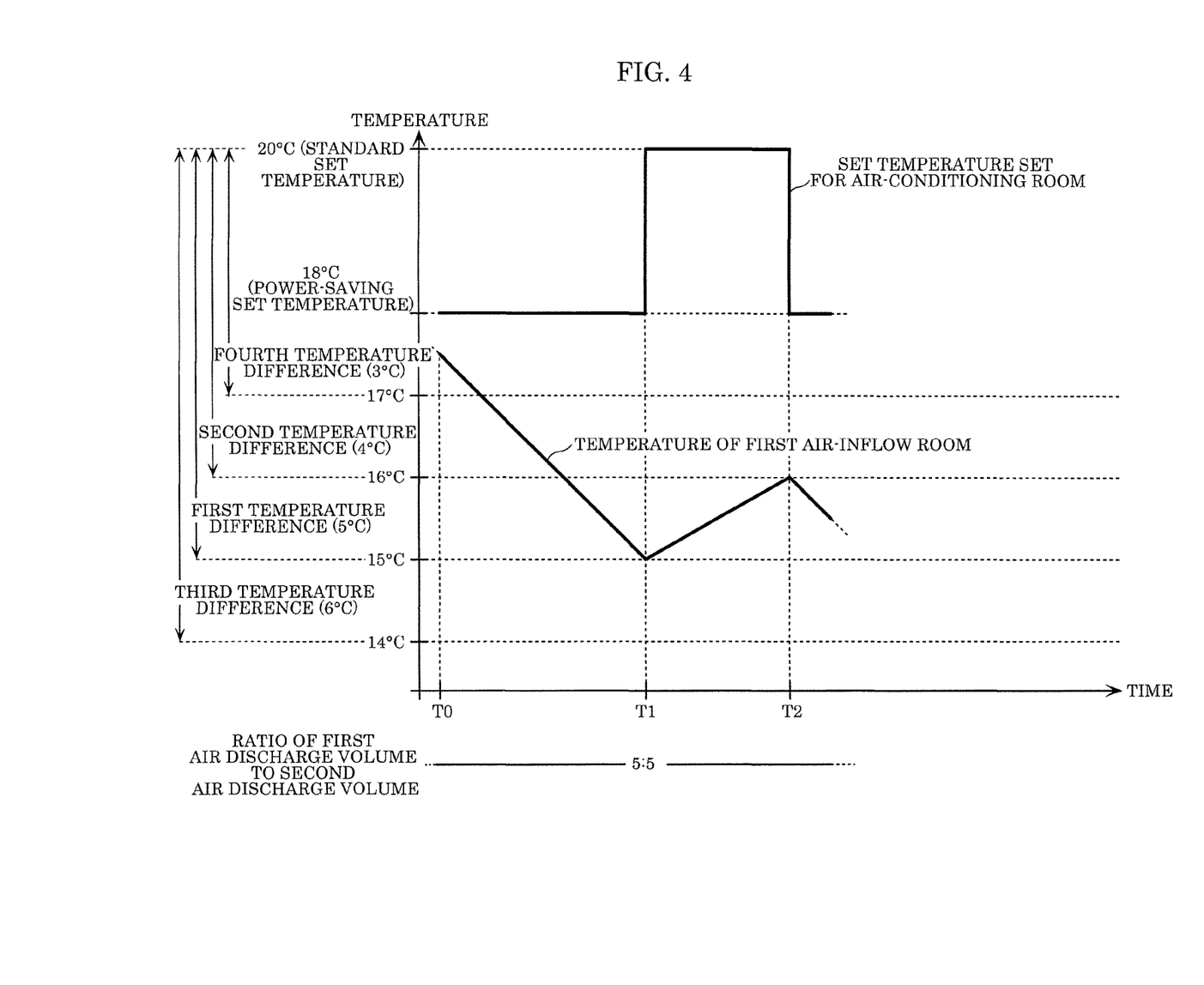
FIG. 4 is a diagram illustrating temperature transition in a first air-inflow room according to a first specific example.

FIG. 4 is a diagram illustrating temperature transition in the first air-inflow room according to the first specific example.

As illustrated in the diagram, in the first specific example, the temperature of the first air-inflow room continues to drop from time T0 to time T1. Then, at time T1, when the temperature of the first air-inflow room drops below 15° C. which is the temperature below the standard set temperature by the first temperature difference (YES in step S3), air conditioner 21 set the set temperature to the standard set temperature (step S4).

Since this causes air conditioner 21 to deliver warm air that is warmer than before, the temperature of air which flows from an air-conditioning room into the first air-inflow room rises, and the temperature of the first air-inflow room starts to rise. Then, at time T2, when the temperature of the first air-inflow room exceeds 16° C. which is the temperature below the standard set temperature by the second temperature difference (YES in step S6), since a person is not present in the air-conditioning room (YES in step S7), air conditioner 21 sets the set temperature to the power-saving set temperature (step S8).

Since this causes air conditioner 21 to deliver warm air that is cooler than before, the temperature of air which flows from the air-conditioning room into the first air-inflow room drops, and the temperature of the first air-inflow room starts to drop.

[2-2-2. Second Specific Example]

Figure 5:
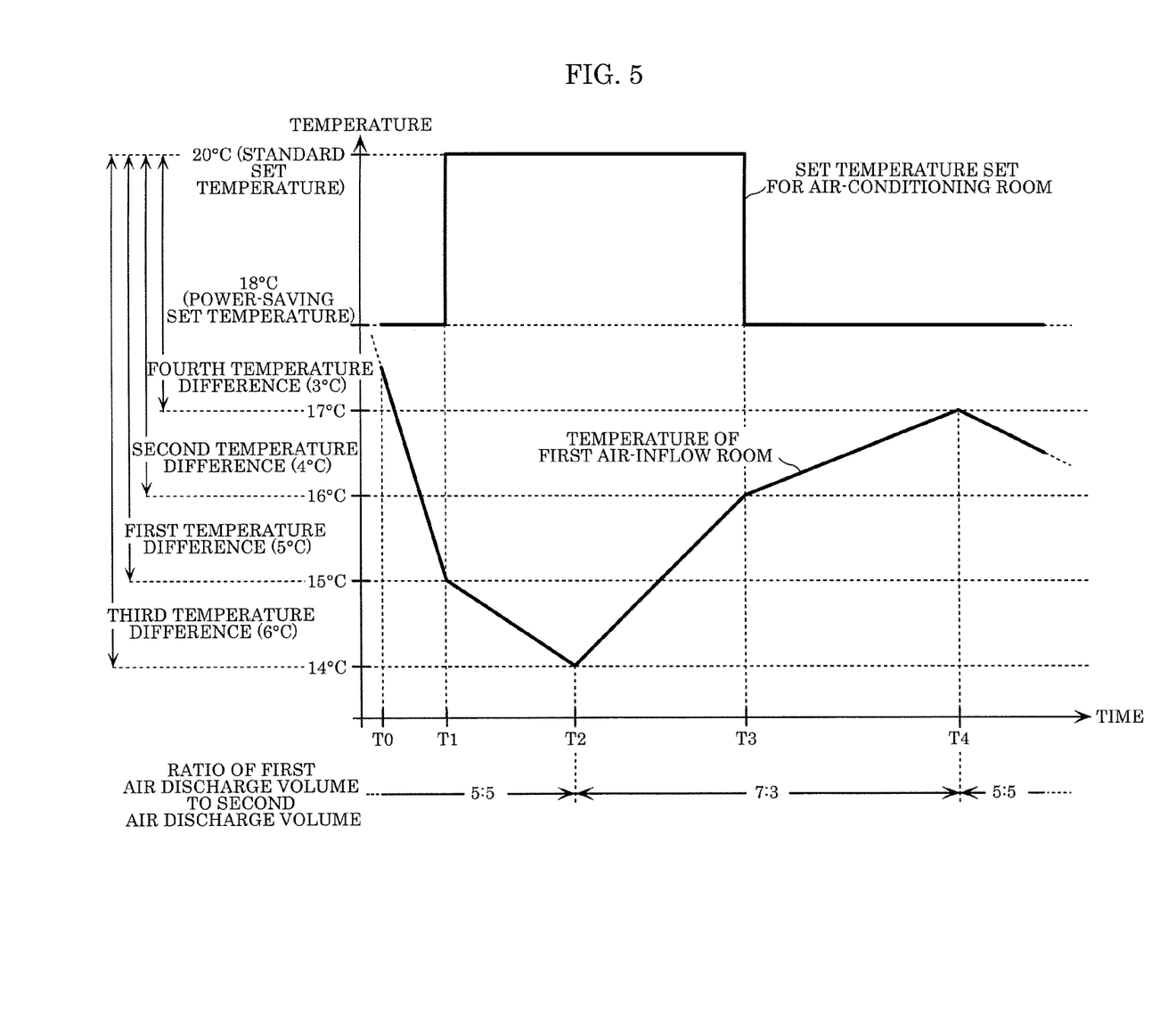
FIG. 5 is a diagram illustrating temperature transition in the first air-inflow room according to a second specific example.

FIG. 5 is a diagram illustrating temperature transition in the first air-inflow room according to the second specific example.

As illustrated in the diagram, in the second specific example, the temperature of the first air-inflow room continues to drop from time T0 to time T1. Then, at time T1, when the temperature of the first air-inflow room drops below 15° C. which is the temperature below the standard set temperature by the first temperature difference (YES in step S3), air conditioner 21 set the set temperature to the standard set temperature (step S4).

Since this causes air conditioner 21 to deliver warm air that is warmer than before, the temperature of air which flows from the air-conditioning room into the first air-inflow room rises. This slows down the pace at which the temperature of the first air-inflow room drops, but the temperature of the first air-inflow room still continues to drop.

Then, at time T2, when the temperature of the first air-inflow room drops below 14° C. which is the temperature below the standard set temperature by the third temperature difference (YES in step S10), first air-discharge fan 31 and second air-discharge fan 32 set the volume of the first air-discharge volume and the volume of the second air-discharge volume, respectively, so that the ratio of the first air-discharge volume to the second air-discharge volume will be 7:3 (step S11).

Since this causes more air to flow from the air-conditioning room into the first air-inflow room than it was before, the temperature of the first air-inflow room starts to rise. Then, at time T3, when the temperature of the first air-inflow room exceeds 16° C. which is the temperature below the standard set temperature by the second temperature difference (YES in step S6) air conditioner 21 sets the set temperature to the power-saving set temperature (step S8), since a person is not present in the air-conditioning room (YES in step S7).

Since this causes air conditioner 21 to deliver warm air that is cooler than before, the temperature of air which flows from the air-conditioning room into the first air-inflow room drops. This slows down the pace at which the temperature of the first air-inflow room rises, but the temperature of the first air-inflow room still continues to rise. Then, at time T4, when the temperature of the first air-inflow room exceeds 17° C. which is the temperature below the standard set temperature by the fourth temperature difference (YES in step S12), first air-discharge fan 31 and second air-discharge fan 32 set the volume of the first air-discharge volume and the volume of the second air-discharge volume, respectively, so that the ratio of the first air-discharge volume to the second air-discharge volume will be 5:5 (step S13).

Since this causes less air to flow from the air-conditioning room into the first air-inflow room than it was before, the temperature of the first air-inflow room starts to drop.

[2-2-3. Third Specific Example]

Figure 6:
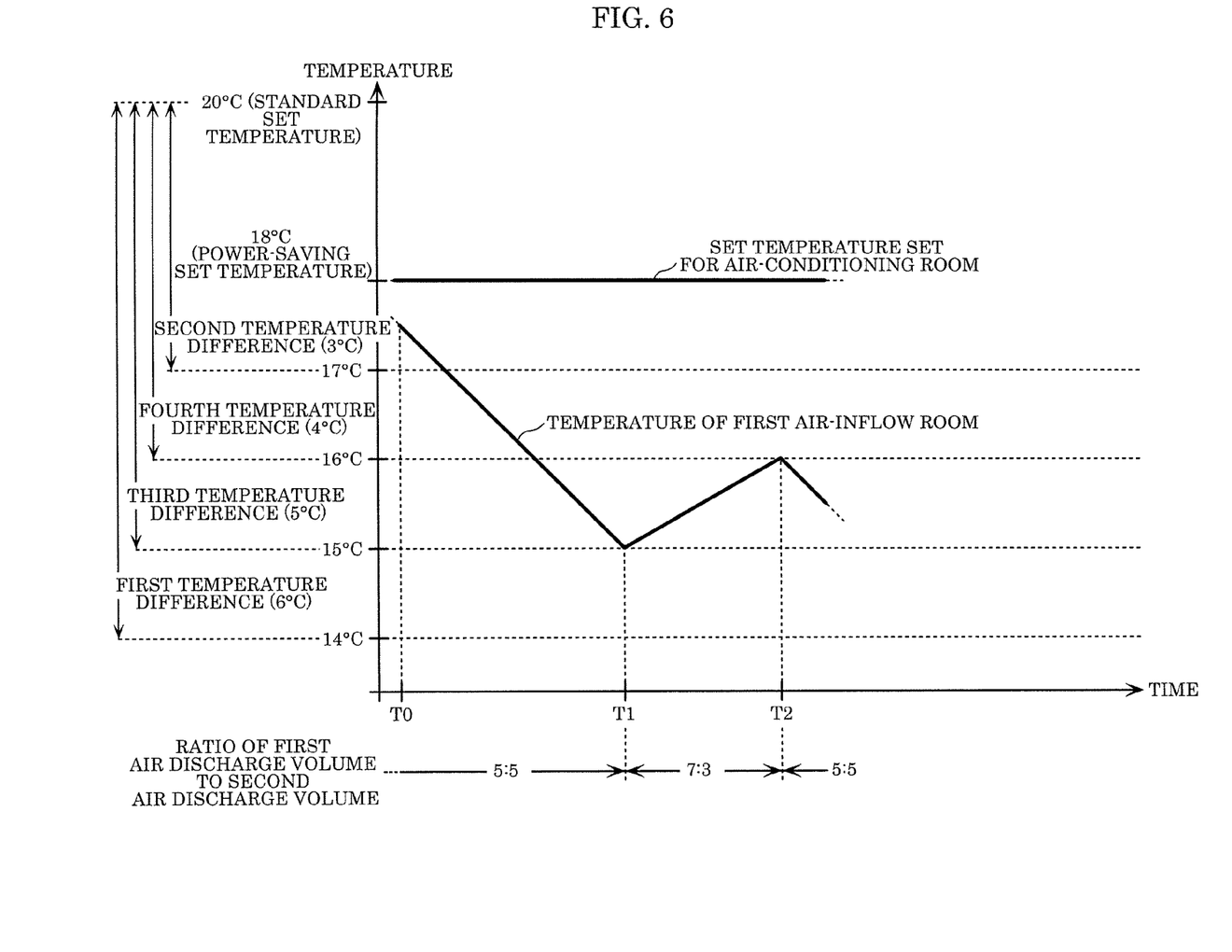
FIG. 6 is a diagram illustrating temperature transition in the first air-inflow room according to a third specific example.

FIG. 6 is a diagram illustrating temperature transition in the first air-inflow room according to the third specific example.

As illustrated in the diagram, in the third specific example, the temperature of the first air-inflow room continues to drop from time T0 to time T1. Then, at time T1, when the temperature of the first air-inflow room drops below 15° C. which is the temperature below the standard set temperature by the third temperature difference (YES in step S10), first air-discharge fan 31 and second air-discharge fan 32 set the volume of the first air-discharge volume and the volume of the second air-discharge volume, respectively, so that the ratio of the first air-discharge volume to the second air-discharge volume will be 7:3 (step S11).

Since this causes more air to flow from the air-conditioning room into the first air-inflow room than it was before, the temperature of the first air-inflow room starts to rise. Then, at time T2, when the temperature of the first air-inflow room exceeds 16° C. which is the temperature below the standard set temperature by the fourth temperature difference (YES in step S12), first air-discharge fan 31 and second air-discharge fan 32 set the volume of the first air-discharge volume and the volume of the second air-discharge volume, respectively, so that the ratio of the first air-discharge volume to the second air-discharge volume will be 5:5 (step S13).

Since this causes less air to flow from the air-conditioning room into the first air-inflow room than it was before, the temperature of the first air-inflow room starts to drop.

[2-2-4. Fourth Specific Example]

Figure 7:
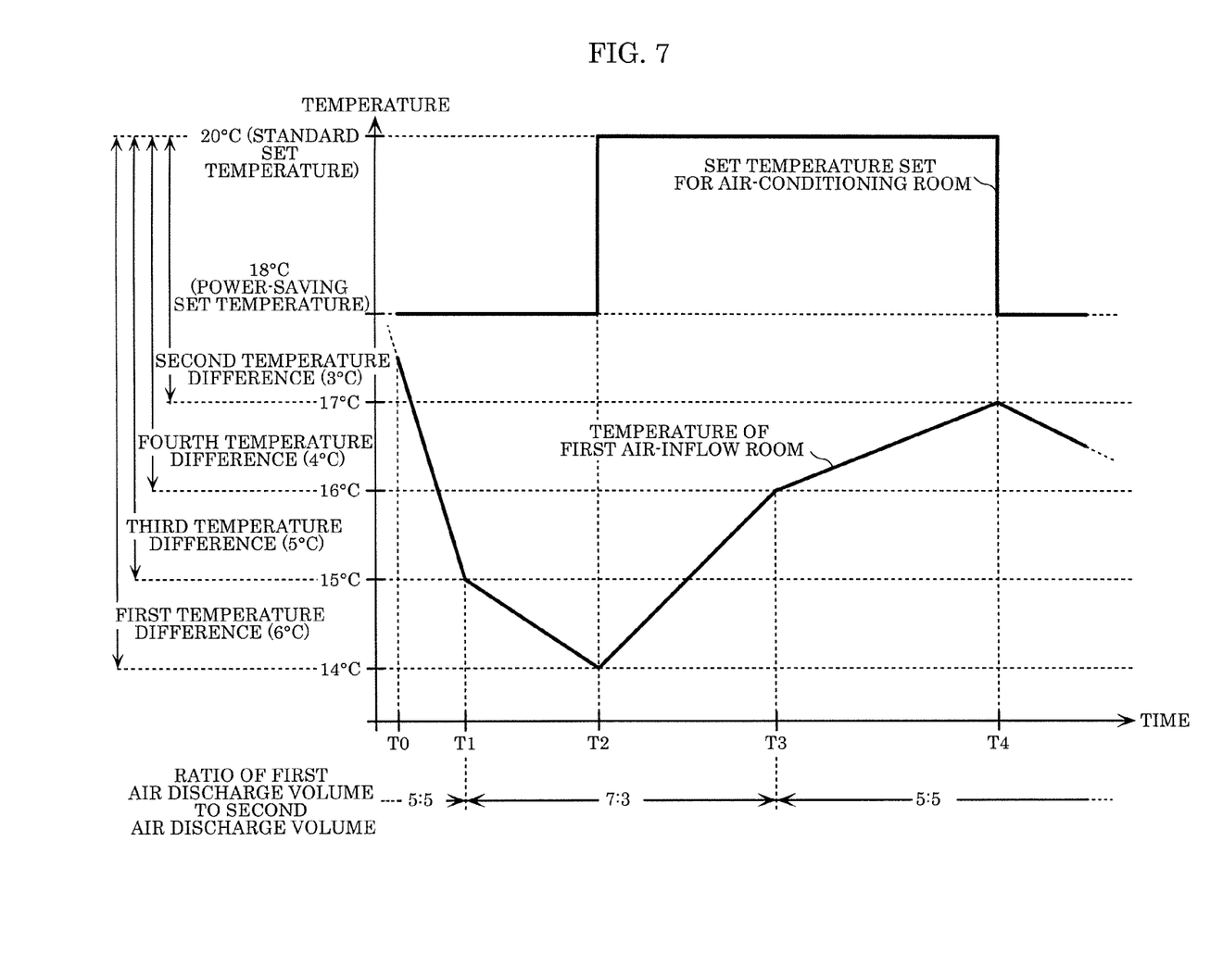
FIG. 7 is a diagram illustrating temperature transition in the first air-inflow room according to a fourth specific example.

FIG. 7 is a diagram illustrating temperature transition in the first air-inflow room according to the fourth specific example.

As illustrated in the diagram, in the fourth specific example, the temperature of the first air-inflow room continues to drop from time T0 to time T1. Then, at time T1, when the temperature of the first air-inflow room drops below 15° C. which is the temperature below the standard set temperature by the third temperature difference (YES in step S10), first air-discharge fan 31 and second air-discharge fan 32 set the volume of the first air-discharge volume and the volume of the second air-discharge volume, respectively, so that the ratio of the first air-discharge volume to the second air-discharge volume will be 7:3 (step S11).

This causes more air to flow from the air-conditioning room into the first air-inflow room than it was before. This slows down the pace at which the temperature of the first air-inflow room drops, but the temperature of the first air-inflow room still continues to drop.

Then, at time T2, when the temperature of the first air-inflow room drops below 14° C. which is the temperature below the standard set temperature by the first temperature difference (YES in step S3), air conditioner 21 set the set temperature to the standard set temperature (step S4).

Since this causes air conditioner 21 to deliver warm air that is warmer than before, the temperature of air which flows from the air-conditioning room into the first air-inflow room rises. Accordingly, the temperature of the first air-inflow room starts to rise. Then, at time T3, when the temperature of the first air-inflow room exceeds 16° C. which is the temperature below the standard set temperature by the fourth temperature difference (YES in step S12), first air-discharge fan 31 and second air-discharge fan 32 set the volume of the first air-discharge volume and the volume of the second air-discharge volume, respectively, so that the ratio of the first air-discharge volume to the second air-discharge volume will be 5:5 (step S13).

This causes less air to flow from the air-conditioning room into the first air-inflow room than it was before. This slows down the pace at which the temperature of the first air-inflow room rises, but the temperature of the first air-inflow room still continues to rise. Then, at time T4, when the temperature of the first air-inflow room exceeds 17° C. which is the temperature below the standard set temperature by the second temperature difference (YES in step S6) air conditioner 21 sets the set temperature to the power-saving set temperature (step S8), since a person is not present in the air-conditioning room (YES in step S7).

Since this causes air conditioner 21 to deliver warm air that is cooler than before, the temperature of air which flows from the air-conditioning room into the first air-inflow room drops. Accordingly, the temperature of the first air-inflow room starts to drop.

[3. Advantageous Effect, Etc.]

As has been described above, according to the above-described air-conditioning control system 1, air flows, into the first air-inflow room, from an air-conditioning room in which an air-conditioning equipment that is controlled according to the temperature of the first air-inflow room is provided.

Accordingly, the temperature of the first air-inflow room is adjusted according to the temperature of its own room, even if the air-conditioning equipment is not provided in its own room.

Other Embodiment, Etc.

Although the above has described the air-conditioning control system according to the embodiment, the embodiment is a mere example. Thus, it is needless to say that various changes, additions, omissions, etc. can be made to the embodiment.

The embodiment has described the configuration of air-conditioning control system 1 in which information obtaining unit 3 obtains information indicating whether a person is present in an air-conditioning room, and controller 4 controls an air conditioner such that the set temperature that is set for the air-conditioning room to be set to the power-saving set temperature, only when the information obtained by information obtainer 3 is negative. Contrarily, as another example of air-conditioning control system 1, it is conceivable that air-conditioning control system 1 has a configuration in which information obtaining unit 3 obtains information indicating whether the present time is within a predetermined period, and controller 4 controls an air conditioner such that the set temperature that is set for the air-conditioning room to be set to the power-saving set temperature, only when the information obtained by information obtaining unit 3 is positive. According to this configuration example, it is possible to prevent the set temperature to be set to the power-saving set temperature except during a period other than a predetermined period.

The embodiment has described that a building which uses air-conditioning control system 1 includes, as air-conditioning rooms, two rooms which are living and dining room 11 in which air conditioner 21 and sensor 23 are provided, and Japanese-style room 12 in which air conditioner 21 and sensor 23 are provided. However, it is not necessary for a building which uses air-conditioning control system 1 to be limited as a building having the configuration as described above so long as the building includes at least one air-conditioning room in which an air conditioner is provided.

In addition, the embodiment has described that a building which uses air-conditioning control system 1 includes, as the first air-inflow room, a room of half bath 13 in which first air-discharge fan 31 and temperature sensor 33 are provided. However, it is not necessary for a building which uses air-conditioning control system 1 to be limited as a building having the configuration as described above so long as the building includes at least one first air-inflow room in which an air-discharge fan and a temperature sensor are provided.

Furthermore, the embodiment has described that air conditioner 21, sensor 23, first air-discharge fan 31, second air-discharge fan 32, and temperature sensor 33 are external devices included in air-conditioning control system 1. However, air-conditioning control system 1 may include some or all of these devices.

Moreover, the embodiment has described that the first temperature difference, the second temperature difference, the third temperature difference, and the fourth temperature difference differ from one another in air-conditioning control system 1. However, if the second temperature difference is smaller than the first temperature difference, and if the fourth temperature difference is smaller than the third temperature difference, relationships among the first temperature difference, the second temperature difference, the third temperature difference, and the fourth temperature difference need not be limited to the relationships described above. For example, the first temperature difference may be equivalent to the third temperature difference or the fourth temperature difference, and the second temperature difference may be equivalent to the third temperature difference or the fourth temperature difference.

In addition, the embodiment has described that in air-conditioning control system 1, information obtaining unit 3 obtains, from sensor 23, information indicating whether a person is present in an air-conditioning room, which is detected by sensor 23. However, if information obtaining unit 3 can obtain the information indicating whether a person is present in the air-conditioning room, it is not necessary for information obtaining unit 3 to be limited to the configuration in which information obtaining unit 3 obtains the information from sensor 23 as exemplified. As another example of the configuration of information obtaining unit 3 in air-conditioning control system 1, it is conceivable that information obtaining unit 3 has a configuration in which information obtaining unit 3 obtains information indicating whether a person is present in the air-conditioning room from information included in a schedule that a user inputs (for example, information such as "in the room from 7:00 to 18:00"). In the case of this example, sensor 23 need not be necessarily provided in an air-conditioning room.

Furthermore, the embodiment has described that first air-discharge fan 31 has a function of communicating with an external device, and that the volume of air to be discharged is settable. However, if first air-discharge fan 31 can realize the inflow of air from an air-conditioning room to the first air-inflow room, first air-discharge fan 31 need not have the function of communicating with the external device, and the volume of air to be discharged need not always be settable.

Moreover, the embodiment has described that second air-discharge fan 32 has a function of communicating with an external device, and that the volume of air to be discharged is settable. However, if second air-discharge fan 32 can realize the inflow of air from an air-conditioning room to the second air-inflow room, second air-discharge fan 32 need not have the function of communicating with the external device, and the volume of air to be discharged need not always be settable.

In addition, the embodiment has described the air-conditioning control processing using an example in which the ratio of the first air-discharge volume to the second air-discharge volume is "5:5" and an example in which the ratio of the first air-discharge volume to the second air-discharge volume is "7:3", as specific examples of the ratio of the first air-discharge volume to the second air-discharge volume. However, these specific ratios are mere examples. These specific ratios may be in any ratios within the range in which the volume of inflow of air to the first air-inflow room after step S11 is processed exceeds the volume of inflow of air to the first air-inflow room after step S13 is processed.

Furthermore, the order of performing the processing procedures (procedures etc. illustrated in FIG. 3) for the above-described air-conditioning control system 1 is not necessarily limited to the performing order as described above. Without departing from the scope of the present invention, the order of performing the procedures can be changed, and some of the procedures can be omitted. Moreover, all or some of the processing procedures (procedures etc. illustrated in FIG. 3) may be realized by hardware or realized using software. For example, air-conditioning control system 1 may be configured of hardware only, without including software (program).

In addition, the present invention encompasses embodiments achieved by optionally combining elements and functions indicated in the embodiments, variations, etc. which are described above.

Note that various aspects of the present invention which are general or specific each include one of or a combination of the following: a device, a system, a method, an integrated circuit, a computer program, a computer-readable recording medium, and the like.

The following describes a configuration, a variation of an aspect of the present invention, an advantageous effect, and the like concerning an air-conditioning system and an air-conditioning control method according to an aspect of the present invention.

(1) An air-conditioning control system according to an aspect of the present invention is an air-conditioning control system which controls air conditioning in a building that includes an air-conditioning room in which an air conditioner is provided and a first air-inflow room into which air flows from the air-conditioning room. The air-conditioning control system is characterized in that it includes: a temperature obtaining unit configured to obtain the temperature of the first air-inflow room; and a controller configured to control the air conditioner, based on the temperature obtained by the temperature obtaining unit.

According to this air-conditioning control system, air flows, into the first air-inflow room, from an air-conditioning room in which an air-conditioning equipment that is controlled according to the temperature of the first air-inflow room is provided.

Accordingly, the temperature of the first air-inflow room is adjusted according to the temperature of its own room even if the air-conditioning equipment is not provided in its own room.

As such, according to the air-conditioning control system, it is possible to adjust the temperature of a room according to the temperature of the room even if an air-conditioning equipment is not provided in the room.

(2) For example, the controller may control the air conditioner, based on the difference between a set temperature that is set for the air-conditioning room and is set in the air conditioner and the temperature obtained.

Accordingly, the temperature of a room can be adjusted according to the difference between the temperature of the room targeted for temperature adjustment and the set temperature.

(3) For example, as a set temperature that is set for the air-conditioning room, the air conditioner is settable to a standard set temperature, and a power-saving set temperature in which power consumption of the air conditioner is less than power consumption of the air conditioner in the standard set temperature. When the air conditioner is set to the power-saving set temperature, and the difference between the standard set temperature and the temperature obtained is greater than the difference between the power-saving set temperature and the temperature obtained, the controller may control the air conditioner to change the set temperature from the power-saving set temperature to the standard set temperature when the difference between the standard set temperature and the temperature obtained exceeds a first temperature difference that is greater than the difference between the standard set temperature and the power-saving set temperature.

Accordingly, it is possible to reduce a possibility that the difference between the temperature of the room targeted for temperature adjustment and the standard set temperature continues to exceed the first temperature difference.

(4) For example, when the air conditioner is set to the standard set temperature, and the difference between the standard set temperature and the temperature obtained is greater than the difference between the power-saving set temperature and the temperature obtained, the controller may control the air conditioner to change the set temperature from the standard set temperature to the power-saving set temperature when the difference between the standard set temperature and the temperature obtained falls below a second temperature difference that is smaller than the first temperature difference.

Accordingly, it is possible to reduce the power consumption of the air conditioner.

(5) For example, the air-conditioning control system further includes an information obtaining unit which obtains information indicating whether a person is present in the air-conditioning room. Only when the information is negative, the controller may further control the air conditioner to set the set temperature to be set to the power-saving set temperature.

Accordingly, when a person is present in an air-conditioning room, it is possible to prevent the set temperature to be set to the power-saving set temperature.

(6) For example, the air-conditioning control system further includes an information obtaining unit which obtain information indicating whether present time is within a predetermined period. Only when the information is positive, the controller may further control the air conditioner to set the set temperature to be set to the power-saving set temperature.

Accordingly, it is possible to prevent the set temperature to be set to the power-saving set temperature except during a period other than a predetermined period.

(7) For example, a first air-discharge fan which discharges air in the first air-inflow room to the outside to cause air from the air-conditioning room to flow into the first air-inflow room is provided in the first air-inflow room. The controller may further control a first air-discharge volume which is a volume of air discharged by the first air-discharge fan per unit time, based on the temperature obtained.

Accordingly, it is possible to more promptly adjust the temperature of a room targeted for temperature adjustment.

(8) For example, the building further includes a second air-inflow room into which air flows from the air-conditioning room. A second air-discharge fan which discharges air in the second air-inflow room to the outside to cause air from the air-conditioning room to flow into the second air-inflow room is provided in the second air-inflow room. When the controller controls the first air-discharge volume, the controller may control the first air-discharge volume and a second air-discharge volume which is a volume of air discharged by the second air-discharge fan per unit time to cause the sum of the first air-discharge volume and the second air-discharge volume to remain invariable.

Accordingly, it is possible to maintain the volume of air discharged outside a building by the first air-discharge fan and the second air-discharge fan invariable.

(9) An air-conditioning control method according to an aspect of the present invention is an air-conditioning control method performed by an air-conditioning control system which controls air conditioning in a building that includes an air-conditioning room in which an air conditioner is provided and a first air-inflow room into which air flows from the air-conditioning room. The air-conditioning control method is characterized in that it includes: a first step obtaining a temperature of the first air-inflow room; and a second step controlling the air conditioner, based on the temperature obtained in the first step.

According to this air-conditioning control method, air flows, into the first air-inflow room, from an air-conditioning room in which an air-conditioning equipment which is controlled according to the temperature of the first air-inflow room is provided.

Accordingly, the temperature of the first air-inflow room is adjusted according to the temperature of its own room, even if an air-conditioning equipment is not provided in its own room.

As such, according to this air-conditioning control method, the temperature of a room can be adjusted according to the temperature of the room, even if an air conditioner is not provided in the room.

REFERENCE MARKS IN THE DRAWINGS 1 air-conditioning control system
2 temperature obtaining unit
3 information obtaining unit
4 controller
10 home (building)
11 living and dining room (air-conditioning room)
12 Japanese-style room (air-conditioning room)
13 half bath (first air-inflow room)
14 washroom (second air-inflow room)
21 air conditioner
21A air conditioner
21B air conditioner
31 first air-discharge fan
32 second air-discharge fan

The invention claimed is:

1. An air-conditioning control system configured to control air conditioning in a building that includes an air-conditioning room in which an air conditioner is provided and a first air-inflow room into which air flows from the air-conditioning room, the air-conditioning control system comprising:
 a temperature obtaining unit configured to obtain a temperature of the first air-inflow room; and
 a controller which controls the air conditioner, based on a difference between a set temperature that is set for the air-conditioning room and the temperature obtained by the temperature obtaining unit, the set temperature being set in the air conditioner.

2. The air-conditioning control system according to claim 1, wherein
 the air conditioner is settable to a standard set temperature, and a power-saving set temperature in which power consumption of the air conditioner is less than power consumption of the air conditioner in the standard set temperature, and
 when the air conditioner is set to the power-saving set temperature, a difference between the standard set temperature and the temperature obtained is greater than a difference between the power-saving set temperature and the temperature obtained, and the difference between the standard set temperature and the temperature obtained exceeds a first temperature difference, the first temperature difference being greater than a difference between the standard set temperature and the power-saving set temperature, the controller is configured to control the air conditioner to change the set temperature from the power-saving set temperature to the standard set temperature.

3. The air-conditioning control system according to claim 2, wherein
 when the air conditioner is set to the standard set temperature, the difference between the standard set temperature and the temperature obtained is greater than the difference between the power-saving set temperature and the temperature obtained, and the difference between the standard set temperature and the temperature obtained falls below a second temperature difference, the second temperature difference being smaller than the first temperature difference, the controller is configured to control the air conditioner to change the set temperature from the standard set temperature to the power-saving set temperature.

4. The air-conditioning control system according to claim 2, further comprising:
 the information obtaining unit configured to obtain information indicating whether a person is present in the air-conditioning room, wherein
 only when the information is negative, the controller is configured to further control the air conditioner to set the set temperature to be set to the power-saving set temperature.

5. The air-conditioning control system according to claim 2, further comprising:
 the information obtaining unit configured to obtain information indicating whether present time is within a predetermined period, wherein
 only when the information is positive, the controller is configured to further control the air conditioner to set the set temperature to be set to the power-saving set temperature.

6. The air-conditioning control system according to claim 1, wherein
 a first air-discharge fan is provided in the first air-inflow room, the first air-discharge fan being configured to discharge air in the first air-inflow room to outside of the building to cause air from the air-conditioning room to flow into the first air-inflow room, and
 the controller is configured to further control a first air-discharge volume, based on the temperature obtained, the first air-discharge volume being a volume of air discharged by the first air-discharge fan per unit time.

7. The air-conditioning control system according to claim 6, wherein
 the building further includes a second air-inflow room into which air flows from the air-conditioning room,
 a second air-discharge fan is provided in the second air-inflow room, the second air-discharge fan being configured to discharge air in the second air-inflow room to outside of the building to cause air from the air-conditioning room to flow into the second air-inflow room, and
 when the controller controls the first air-discharge volume, the controller is configured to control the first air-discharge volume and a second air-discharge volume to cause a sum of the first air-discharge volume and the second air-discharge volume to remain invariable, the second air-discharge volume being a volume of air discharged by the second air-discharge fan per unit time.

8. An air-conditioning control method performed by an air-conditioning control system configured to control air conditioning in a building that includes an air-conditioning room in which an air conditioner is provided and a first air-inflow room into which air flows from the air-conditioning room, the air-conditioning control method comprising:
 obtaining a temperature of the first air-inflow room; and
 controlling the air conditioner based on a difference between a set temperature that is set for the air-conditioning room and the temperature obtained, the set temperature being set in the air conditioner.

* * * * *

UNITED STATES PATENT AND TRADEMARK OFFICE
CERTIFICATE OF CORRECTION

PATENT NO. : 11,060,751 B2  
APPLICATION NO. : 16/486756  
DATED : July 13, 2021  
INVENTOR(S) : Hayato Takahashi et al.

Page 1 of 1

It is certified that error appears in the above-identified patent and that said Letters Patent is hereby corrected as shown below:

On the Title Page

In (87) PCT Pub. Date reads:  
"Oct. 14, 2018"  
Should read:  
--Oct. 4, 2018--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*